United States Patent
Wohrle

(10) Patent No.: US 8,279,632 B2
(45) Date of Patent: Oct. 2, 2012

(54) APPARATUS FOR TRANSFER OF ELECTRICAL ENERGY

(75) Inventor: Markus Wohrle, Eisenberg (DE)

(73) Assignee: Endress + Hauser Wetzer GmbH + Co. KG, Nesselwang (DE)

( * ) Notice: Subject to any disclaimer, the term of this patent is extended or adjusted under 35 U.S.C. 154(b) by 120 days.

(21) Appl. No.: 12/735,800

(22) PCT Filed: Feb. 11, 2009

(86) PCT No.: PCT/EP2009/051580
§ 371 (c)(1),
(2), (4) Date: Aug. 18, 2010

(87) PCT Pub. No.: WO2009/103644
PCT Pub. Date: Aug. 27, 2009

(65) Prior Publication Data
US 2010/0321955 A1 Dec. 23, 2010

(30) Foreign Application Priority Data
Feb. 19, 2008 (DE) .......................... 10 2008 009 859

(51) Int. Cl.
*H02M 3/335* (2006.01)
(52) U.S. Cl. .................................. 363/21.01; 363/21.12
(58) Field of Classification Search .................... 363/16, 363/20, 21.01, 24, 55, 56.02, 95, 97, 131, 363/21.12; 307/22, 26, 72, 80, 128
See application file for complete search history.

(56) References Cited

U.S. PATENT DOCUMENTS

| | | | | |
|---|---|---|---|---|
| 4,706,177 A * | 11/1987 | Josephson | ....................... | 363/24 |
| 5,029,064 A * | 7/1991 | Ball | ............................... | 363/65 |
| 5,075,837 A * | 12/1991 | Feldtkeller | ....................... | 363/19 |
| 5,790,391 A * | 8/1998 | Stich et al. | ....................... | 363/24 |
| 5,811,889 A * | 9/1998 | Massie | ............................ | 307/44 |
| 5,930,122 A | 7/1999 | Moriguchi et al. | | |
| 6,320,764 B1 | 11/2001 | Jiang | | |
| 7,190,091 B1 | 3/2007 | Marshall | | |
| 8,044,643 B1 * | 10/2011 | Notohamiprodjo et al. | .. | 323/235 |
| 2001/0019492 A1 | 9/2001 | Burton | | |

FOREIGN PATENT DOCUMENTS

| | | |
|---|---|---|
| JP | 58-48125 | 3/1983 |
| JP | 06133548 A | 5/1994 |
| JP | 07007932 A * | 1/1995 |

\* cited by examiner

*Primary Examiner* — Adolf Berhane
(74) *Attorney, Agent, or Firm* — Bacon & Thomas, PLLC

(57) ABSTRACT

An apparatus for transfer of electrical energy between a primary side and a secondary side. The apparatus includes: at least one voltage input on the primary side; at least one transformer, wherein the transformer has on the primary side at least a first winding area and a second winding area; and at least one voltage monitoring unit, wherein the voltage monitoring unit is embodied in such a manner, that it connects the voltage input with the first winding area or the second winding area as a function of a primary voltage present at the voltage input.

12 Claims, 2 Drawing Sheets

APPARATUS FOR TRANSFER OF ELECTRICAL ENERGY

TECHNICAL FIELD

The invention relates to an apparatus for transferring electrical energy between a primary side and a secondary side. In such case, the apparatus is, for example, a component of a power device or of a field device of process and automation technology. The field device is, for example, a measuring device for determining and/or monitoring a process variable (e.g. fill level, temperature, density, viscosity, pH-value or flow) of a medium, or a data logging device, which records or further processes measurement data of a measuring device or actuator.

BACKGROUND DISCUSSION

In the state of the art, clocked, switching power supplies are primarily applied for producing protective low voltages (voltages lower than 50 V). For producing a plurality of galvanically isolated output voltages with smaller output power, for example, flyback converters are used. This involves, in such case, a direct voltage converter, which is used for the transmission of electrical energy between two direct voltage circuits, which have different voltages, and which can be galvanically isolated from one another. The principle underlying the flyback converter is that a small amount of energy is stored in the magnetic field of a coil—for example, the primary winding of a transformer—and this energy is thereafter transferred to the secondary, or consumption, side of the transformer. This cycle is passed through some thousand times per second, so that a virtually continuous energy flow arises.

Such circuits function excellently for input voltage ranges up to a ratio of 4:1; that is to say, in the case of a maximal voltage of 250 V AC, the lower limit lies at 62.5 V AC. For larger input voltage ratios, a number of compromises must be made with regard to efficiency and control behavior. Associated therewith is the fact that some components must be dimensioned for a considerably greater power level, and thus are more expensive.

SUMMARY OF THE INVENTION

An object of the invention is to provide a transformer apparatus, which 1) is based on the flyback converter principle, which 2) is designed for as large a voltage range as possible, and which 3) is, in such case, as cost-effective as possible.

The invention achieves this object by an apparatus for transferring electrical energy between a primary side and a secondary side, wherein the apparatus comprises: At least one voltage input on the primary side; at least one transformer; wherein the transformer on the primary side has at least a first winding area and a second winding area; and at least one voltage monitoring unit, wherein the voltage monitoring unit is embodied in such a manner that it connects the voltage input with the first winding area or with the second winding area as a function of a primary voltage present at the voltage input. The invention thus especially resides in a primary clocked power supply, which works over a very large input voltage range by automatic input voltage range switching. In such case, the winding areas especially permit a "switching" of the transformer ratio of the transformer. By the number of the winding areas, different transformer ratios—and, therefore, voltage ranges—are thus provided for the primary voltage.

An embodiment provides that the first winding area essentially encompasses the entire primary winding of the transformer.

An embodiment includes that the second winding area encompasses only a part of the primary winding of the transformer.

An embodiment provides that the voltage monitoring unit connects the voltage input with the first winding area, in the case in which the primary voltage applied to the voltage input lies above a predeterminable limit value. The limit value, in such case, results as a function of the particular transformer ratios resulting from the individual winding areas.

An embodiment includes that the voltage monitoring unit connects the voltage input with the second winding area, in the case in which the primary voltage present at the voltage input lies below a predeterminable limit value. In the case of more than two winding areas, a corresponding number of limit values or voltage ranges is also, in such case, to be specified.

An embodiment provides that the transformer effects a galvanic isolation between the primary side and the secondary side, i.e. that the transformer is embodied in such a manner, that it serves as a galvanic isolator.

An embodiment includes that at least one storage capacitance is provided on the primary side for intermediate storage of the primary voltage.

An embodiment provides that at least one rectifier is provided on the primary side for rectifying the primary voltage.

An embodiment includes that, on the primary side, at least one clocking control unit is provided, which is connected with the transformer. Via a pulse-pause ratio, this clocking control unit also influences the effective transformer ratio of the transformer.

An embodiment provides that the voltage monitoring unit sets the capacitance of the storage capacitance as a function of the primary voltage.

An embodiment includes that the voltage monitoring unit adjusts the capacitance of the storage capacitance by switching in, or out, a supplemental capacitor.

An embodiment provides that the voltage monitoring unit lowers the capacitance of the storage capacitance, in the case in which the primary voltage lies above the limit value.

An embodiment includes that the voltage monitoring unit increases the capacitance of the storage capacitance, in the case in which the primary voltage lies below the limit value.

BRIEF DESCRIPTION OF THE DRAWINGS

The invention will now be explained in greater detail on the basis of the appended drawing, the figures of which show as follows.

DETAILED DISCUSSION IN CONJUNCTION WITH THE DRAWINGS

Figure 1:
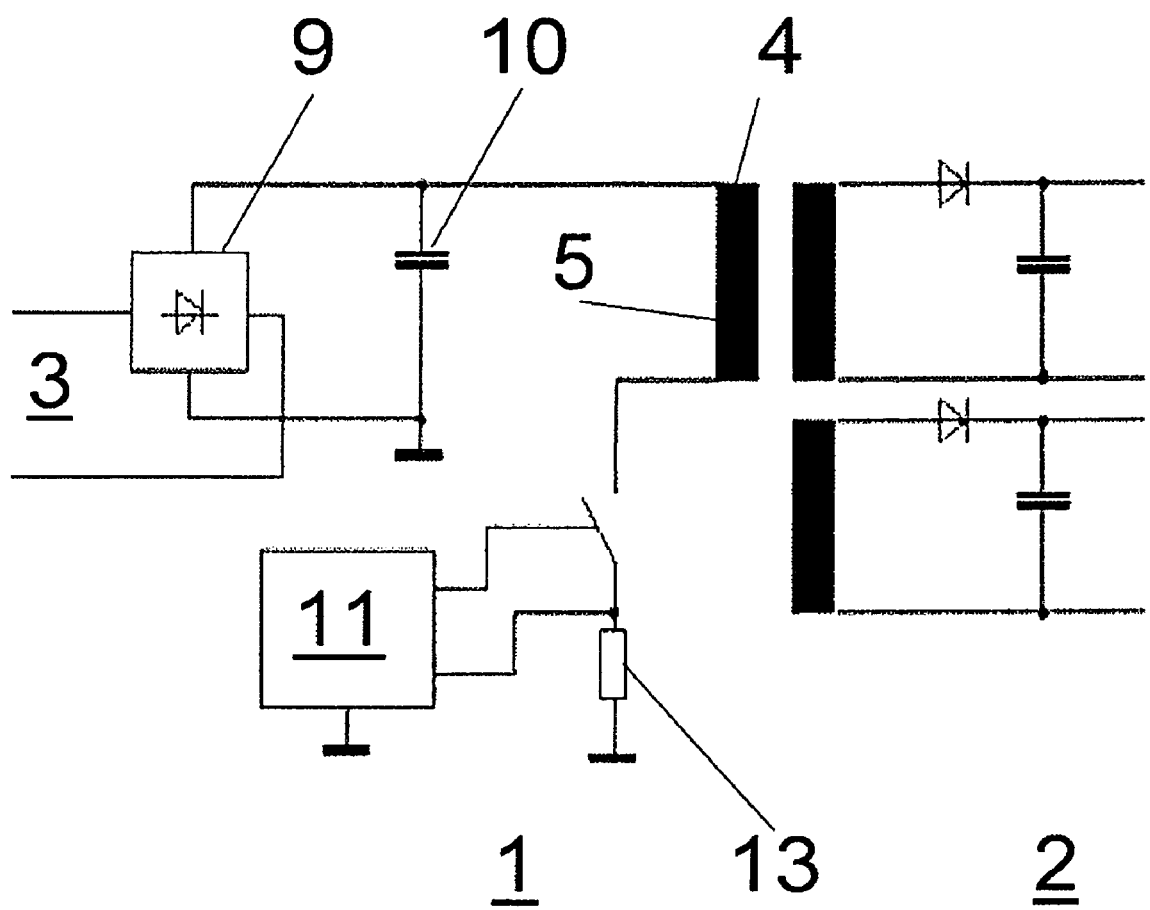
FIG. 1 is an apparatus for transfer of electrical energy according to the state of the art.

FIG. 1 shows a flyback converter according to the state of the art. Here, between a primary side 1 and a secondary side 2, a transformer 4 is provided, which, among other things, causes there to be a galvanic isolation between the two sides. The core of the transformer includes an air gap. Present at the voltage input 3 is a primary voltage, whose value can vary over a certain range. The primary voltage is here converted into a direct voltage via a rectifier 9, and then stored intermediately in a storage capacitance 10 provided by a capacitor.

The storage capacitance 10 takes into consideration that the supplying of the primary side 1 with the primary voltage usually takes place at the frequency of the grid voltage, whereas the clocking of the transformer 4 occurs, however, at a notably higher frequency. The voltage input 3 and the storage capacitance 10, respectively, are here connected with the winding area 5 of the transformer 4, which comprises the complete primary winding of the transformer 4.

For transforming the voltage, the primary side of the transformer 4 is connected with a clocking control unit 11, which here is a pulse-pause control unit. The pulse-pause ratio with which the primary side of the transformer 4 is supplied with the voltage depends on the primary voltage present at the voltage input 3, wherein care is taken, that, on the secondary side 2, a voltage essentially corresponding to the desired or required transformer ratio can be tapped. In order to hold the output, or secondary, voltage constant in the case of an increase in the input, or primary, voltage, the pulse length of the rectangular voltage on the primary side fed to the transformer 4 is shortened. Since the pulse-pause ratio can only be changed within particular limits, only a limited input voltage range is possible.

The clocking control unit 11 is, moreover, here connected with a resistor 13, which functions as an electrical current measuring resistor.

On the secondary side 2, two different winding areas are provided here. In each of these two outputs, a diode and a capacitor for smoothing the voltage signal are provided.

A problem with such a flyback converter according to the state of the art lies in the fact that the pulse-pause ratio, with which the primary side of the transformer 4 is operated, can vary only within certain ranges. In association therewith, the primary voltage is also permitted to lie only within certain ranges, should a predetermined transformer ratio be adherred to.

Figure 2:
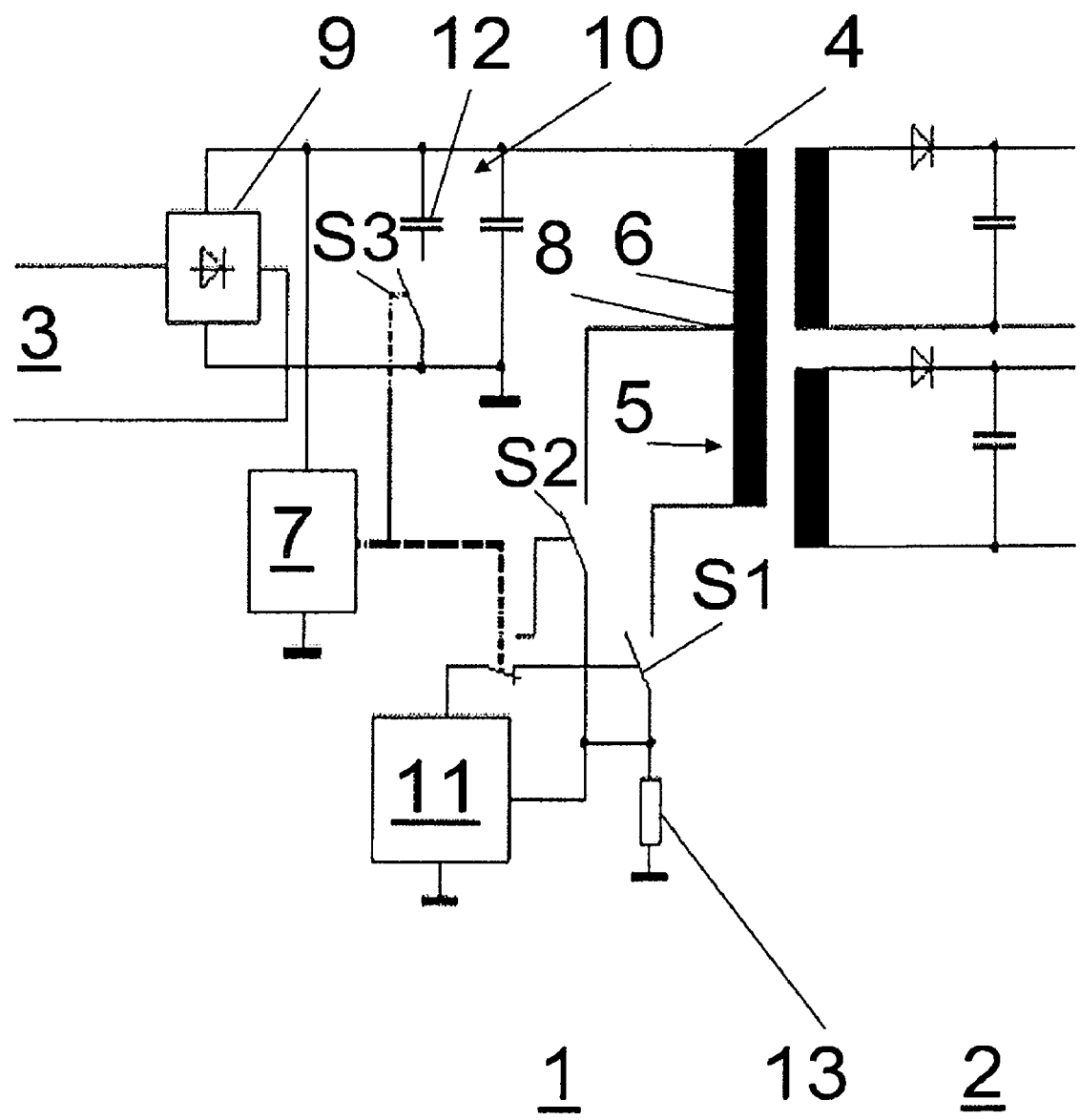
FIG. 2 is an apparatus of the invention.

FIG. 2 shows a circuit of the invention, which especially expands the flyback converter principle. The circuit is, for example, a component of a power device or of a field device of process and automation technology. The field device is, for example, a measuring device for determining and/or monitoring a process variable (e.g. fill level, temperature, density, viscosity, pH-value or flow) of a medium, or a data logging device, which records or further processes measurement data of a measuring device or an actuator. The transformer 4 has available here two different winding areas 5 and 6 on its primary side. The first winding area 5 is, in such case, greater than the second winding area 6, and here especially essentially completely comprises the primary winding area of the transformer 4. The second winding area 6 arises from a center tapping. Following the rectifier 9, the voltage monitoring unit 7 is provided, which monitors the size of the rectified, primary voltage. For its control tasks, the voltage monitoring unit 7 is, via switch, connected both with the storage capacitance 10, as well as with the primary side of the transformer 4. As a function of the primary voltage, the voltage monitoring unit 7 takes care that the clocking control unit 10 is connected either with the first winding area 5 or with the second winding area 6, this in turn meaning that the transformer ratio of the transformer 4 is, in each case, also variously set as a function of the present voltage. Furthermore, via its connection with the storage capacitance 10, the voltage monitoring unit 7 can change the capacitance value by switching a supplemental capacitor 12 in or out.

Regarding the switching in detail, the block, voltage monitoring unit 7, measures the value of the rectified input voltage. For the upper voltage range, i.e. above the predeterminable limit voltage, switch S1 is closed, and switches S2 and S3 are opened. For the lower voltage range, switch S2 and switch S3 are closed, and switch S1 is opened. This means that the voltage input 3 and the storage capacitance 10, respectively, are, then, connected either with the first winding area 5 or with the second winding area 6. When switch S3 is closed, the supplemental capacitor 12 is also switched in, which is required for additional filtering of the rectified input voltage for the lower input voltage range. The circuit architecture with two capacitors has the advantage that instead of one capacitor of very large construction, two small capacitors with suitable capacitance and proof voltage values can be used. The reason for this lies in the fact, that for filtering at low input levels, a capacitor with a high capacitance is required, and in the case of high levels, only a small capacitance is required. For such purposes, the capacitor must, however, possess a very high proof voltage. If the circuit uses only one capacitor, it must then possess both a high capacitance, as well as a high proof voltage. This leads to large structures, which require considerably more space and higher costs than the embodiment shown here having two capacitors.

The limit value for the primary voltage or for the switch-over between the winding areas 5, 6 is, in such case, selected in such a manner, that the particular transformer ratio from the clocking control unit 10 is, in each case, optimal.

The circuit of the invention thus permits a voltage supply with a very large input voltage range, wherein, here, also a number of galvanically isolated output voltages are produced. This power supply of the invention especially permits operation with an alternating input voltage range between 20 V and 250 V. Moreover, the power loss as compared with conventional power supplies is also reduced.

Advantages the invention include, thus, among others, the following: A high efficiency exists over the complete input voltage range, so that power loss is reduced. At the same time, a better control behavior over the whole input voltage range is also enabled. The size of the transformer is smaller than in the state of the art. Moreover, the larger input range also enables a reducing of the device variants, since only a power supply for the range between 20 V and 250 V is required.

The invention claimed is:

1. An apparatus for transfer of electrical energy between a primary side and a secondary side, comprising:
    at least one voltage input on the primary side;
    at least one transformer; wherein said transformer has on the primary side at least a first winding area and a second winding area; and
    at least one voltage monitoring unit, wherein:
    said voltage monitoring unit is embodied in such a manner that it connects said voltage input with said first winding area or said second winding area as a function of a primary voltage present at said voltage input, wherein:
    the apparatus further comprises at least one storage capacitance on the primary side for intermediate storage of primary voltage; and
    said at least one voltage monitoring unit sets capacitance of said at least one storage capacitance as a function of primary voltage.

2. The apparatus as claimed in claim 1, wherein:
    said first winding area comprises essentially the entire primary winding of said transformer.

3. The apparatus as claimed in claim 1, wherein:
    said second winding area comprises only a part of said primary winding of said transformer.

4. The apparatus as claimed in claim 1, wherein:
said voltage monitoring unit connects said voltage input with said first winding area, in the case in which primary voltage present at said voltage input lies above a predeterminable limit value.

5. The apparatus as claimed in claim 1, wherein:
said voltage monitoring unit connects said voltage input with said second winding area, in the case in which the primary voltage present at said voltage input lies below a predeterminable limit value.

6. The apparatus as claimed in claim 1, wherein:
said transformer effects a galvanic isolation between said primary side and said secondary side.

7. The apparatus as claimed in claim 1, further comprising:
at at least one rectifier on the primary side for rectifying primary voltage.

8. The apparatus as claimed in claim 1, further comprising:
at least one clocking control unit, on the primary side, which is connected with said transformer.

9. The apparatus as claimed in claim 4, further comprising:
a supplemental capacitor, wherein:
said at least one voltage monitoring unit sets capacitance of said at least one storage capacitance by switching in, or out, said supplemental capacitor.

10. The apparatus as claimed in claim 4, wherein:
said at least one voltage monitoring unit lowers capacitance of said at least one storage capacitance, in the case in which the primary voltage lies above the limit value.

11. The apparatus as claimed in claim 4, wherein:
said at least one voltage monitoring unit increases the capacitance of said at least one storage capacitance, in the case in which primary voltage lies below the limit value.

12. An apparatus for transfer of electrical energy between a primary side and a secondary side, comprising:
at least one voltage input on the primary side;
at least one transformer, wherein said transformer has on the primary side at least a first winding area; and
at least one voltage monitoring unit, wherein:
said voltage monitoring unit is connected to said voltage input and with said first winding area,
wherein the apparatus further comprises at least one storage capacitance on the primary side for intermediate storage of primary voltage, wherein:
said at least one voltage monitoring unit sets capacitance of said at least one storage capacitance as a function of primary voltage.

* * * * *